United States Patent

[11] 3,624,050

[72] Inventors Jorg Strickrodt
Heinrich Stoerl Strasse 39, 3011 Laatzen;
Ullrich Konig, Holbeinstrasse 12, 334
Wolfenbuttel, both of Germany
[21] Appl. No. 6,594
[22] Filed Jan. 28, 1970
[45] Patented Nov. 30, 1971

[54] PROCESS FOR PRODUCING POLYIMIDES VIA POLYAMIDE ACIDS WITHOUT USE OF SOLVENTS
4 Claims, No Drawings

[52] U.S. Cl. .................................................. 260/78 TF,
260/47 CP
[51] Int. Cl. .................................................... C08g 20/32
[50] Field of Search ........................................ 260/78 TF

[56] References Cited
UNITED STATES PATENTS
2,149,273  3/1939  Carothers ................... 260/78

| | | | |
|---|---|---|---|
| 2,867,609 | 1/1959 | Edwards et al. ............... | 260/78 |
| 3,179,634 | 4/1965 | Edwards ....................... | 260/78 |
| 3,329,653 | 7/1967 | Beavers et al. ................ | 260/47 |
| | FOREIGN PATENTS | | |
| 570,858 | 7/1945 | Great Britain ................ | 260/78 |

*Primary Examiner*—Howard E. Schain
*Attorney*—William A. Hoffman

ABSTRACT: Process for producing polyimides by treating a dianhydride and a diprimary amine at a temperature in the range of 20° C. to 120° C. in the absence of a solvent and with continuous mixing to form a polyamide acid and converting the polyamide acid to the corresponding polyimide by heating the polyamide acid at a temperature in the range of 0 to 20° above the maximum temperature difference shown by the polyamide acid under differential thermal analysis.

PROCESS FOR PRODUCING POLYIMIDES VIA POLYAMIDE ACIDS WITHOUT USE OF SOLVENTS

BACKGROUND OF THE INVENTION

It is known that polyamide acids can be produced through polyaddition of dianhydrides, for example, aromatic tetracarboxylic acids, with primary diamines under the following conditions: The starting materials are dissolved in a solvent, such as N,N'-dimethylformamide or 1-methyl-2-pyrrolidinone, together or in sequence. The starting materials react exothermically to form polyamide acids at room temperature to 120° C. These can be prepared pure by evaporating the solvent. Pyromellitic dianhydride is usually used as the dianhydride and as diprimary diamines, aromatic ones, such as diaminodiphenyl ether or aliphatic ones, such as dodecamethylenediamine are used.

In obtaining the polyamide acids according to this process it has been found that with respect to the properties of the polyimides to be produced from the polyamide acids it is not immaterial in what concentration the reaction partners are present. Thus, the temperature stability improves with increasing dilution of the reaction partners. Besides, how and especially how rapidly the reaction partners are mixed and can enter into reaction, plays a role. For example, it is known that one obtains polyimides with good thermal properties when one adds the diamine solution slowly with stirring to the provided dianhydride solution.

SUMMARY OF THE INVENTION

However, our own experiments have shown that one can arrive at comparable products if one provides the diamine solution and subsequently adds the dianhydride solution.

Further studies led to the finding of the process of the invention in which the reaction partners are allowed to react without the addition of special solvents in the manner described below.

This process avoids a number of disadvantages of the known processes:

Solvent need no longer be separated from the reaction products. Through this, apparatus necessary to produce the solutions and for removal of the solvent through filtration and distillation is eliminated. The removal of traces of solvent in vacuum can take many hours or even days. The energy necessary for drying the products likewise is eliminated.

According to the process of the invention, the dianhydrides and diamines can be reacted either in the solid phase or with sintering and partial melting or by partial solution of one reaction partner in the other. Hereby, particular importance is attributed to reaction in the exclusively solid phase, chiefly because the diamines of interest for producing commercial polyamide acids and polyimides, such as dodecamethylenediamine, p-phenylenediamine and 4,4-diaminophenyl ether are solid at the polyamide acid formation temperatures, ca. 20°–120° C. All of the polyamide acids produced according to the process of the invention, likewise, are solids.

As a particular advantage of the process of the invention, it was found that the grain size of the raw materials, with adequate mixing during the reaction, has no effect on the mechanical and thermal properties of the polyimides obtained from the polyamide acids. This fact can be reconciled by the observation according to which the grain size of the polyamide acids is not influenced by the grain size of the raw materials. Apparently, the polyamide acid particles formed during the reaction are comminuted during the mixing, whereby they can be separated from dianhydride and diamine simultaneously after reaching a certain grain size. There is an increase in volume parallel to the grain-size reduction, which can reverse toward the end of the reaction through compression of the charge. The latter was observed, for example, especially on using short-chain aliphatic diamines and with aromatic diamines. To be sure, the grain distribution and grain size affect the reaction velocity. Therefore, it is expedient not to exceed a grain size of 0.5–0.8 mm. and to select the narrowest possible grain-size range of the starting materials, from about 0.3–0.5 mm.

The mixing is suitably accomplished in mixers of the rotating and centrifuging type that have been developed for mixing viscous compositions and for building up granulates of dusts and suspensions; for example, in a double-walled, heatable mixer with fixed drum and stirrer that can be adjusted to various speeds.

It is known that polyamide acids can be converted into the corresponding polyimides by heating to 150°–250° C. with the elimination of water. It has now been found that at too high a temperature the crystallinity of the polyimides is too great, which leads to undesired properties. At temperatures that are too low, the reaction velocity is too slow, so that the polyimide production can no longer be carried out commercially.

It was found that the maximum in the differential thermal analysis is a measure of the optimum imidization temperature. In differential thermal analysis, the sample under investigation is heated simultaneously with an inert sample, that is, a sample that does not change physically or chemically. The temperature difference between the two samples is measured. If an exothermic or endothermic reaction occurs in the sample being investigated, this displays a higher or lower temperature, respectively, than the inert sample. If one subjects the polyamide acid to differential thermal analysis, a maximum in the temperature difference appears at a certain temperature. Using pyromellitic dianhydride and ethylenediamine, this maximum is located at 150° C., if, instead of this, one introduces dodecamethylenediamine, the temperature increases to 160° C.

It has now been found that one obtains polyimides with good properties without very long reaction times, if one operates at temperatures 10° C. above this maximum. In addition, it was shown that a temperature fluctuation of 10° is permissible.

DESCRIPTION OF PREFERRED EMBODIMENT

EXAMPLE

One mole of pyromellitic dianhydride, recrystallized in acetic anhydride, (218 g.) and 1 mole of dodecamethylenediamine, (200 g.) were poured together, within about 5 seconds, into a 5 liter, double-walled mixer heated to 50° C. with oil with the aid of a thermostat. The mixer could be regulated continuously, its drum length was about 175 mm. and its drum diameter was about 190 mm. It operated on the centrifuging and rotating process. The working capacity was 0.34–0.5 horsepower. The stirrer speed was adjusted to 200 r.p.m.

The raw materials charged had the following grain sizes (microns):

|  | Maximum | Minimum | Average |
| --- | --- | --- | --- |
| Pyromellitic dianhydride | 20 | 3 | 7 |
| Dodecamethylenediamine | 200 | 10 | 40 |

The experiment was carried on for 1.5 hours.

The starting mixture with a bulk density of 0.6 g./cm.$^3$ increases its volume threefold during the reaction. At the end of the reaction the pouring weight was 0.2 g./cm.$^3$. After the reaction, the grain sizes were 10 microns maximum and 1 micron minimum with 5 microns on the average.

Using infrared spectroscopy, it could be shown that the reaction product consisted of pure polyamide acid. For characterization, the —CO—NH— valence vibration at 6.4 microns was used. Subsequently, the polyamide acid was added within 5 seconds to a mixer heated to 170° C. Water elimination was concluded after 90 minutes. The polyimide was identified by a band at 5.85 microns. It had a softening point of about 395° C.

What is claimed is:

1. A process for producing a particulate polyamide acid which comprises reacting in the solid phase with continuous mixing without added solvents an aromatic tetracarboxylic acid dianhydride and a primary diamine at a temperature in the range of about 20° C. to about 120° C.

2. The process of claim 1 wherein the polyamide acid is converted to the corresponding polyimide by heating the polyamide acid at a temperature in the range of 0° to 20° above the maximum temperature difference shown by the polyamide acid under differential thermal analysis.

3. The process of claim 1 wherein the grain sizes of the starting materials for production of the polyamide acid are not greater than about 0.8 mm.

4. The process of claim 1 wherein said temperature is between about 20° C. and about 120° C.

* * * * *